(12) United States Patent
Will

(10) Patent No.: US 6,540,043 B2
(45) Date of Patent: Apr. 1, 2003

(54) VEHICLE STEERING SYSTEM WITH ELECTRONIC POWER REGULATION UNIT FOR LIMITING THE STEERING ANGLE OF REAR WHEELS AT HIGH SPEEDS

(75) Inventor: Anthony Barnard Will, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/885,185

(22) Filed: Jun. 21, 2001

(65) Prior Publication Data

US 2002/0195293 A1 Dec. 26, 2002

(51) Int. Cl.$^7$ .................................................. B62D 5/04
(52) U.S. Cl. ....................... 180/404; 180/412; 180/445; 701/43
(58) Field of Search ................................. 180/404, 405, 180/406, 407, 408, 412, 413, 443, 445; 701/41, 43

(56) References Cited

U.S. PATENT DOCUMENTS

| | | | | |
|---|---|---|---|---|
| 4,953,649 A | * | 9/1990 | Kawai et al. | 180/404 |
| 4,956,590 A | * | 9/1990 | Phillips | 180/446 |
| 4,970,647 A | | 11/1990 | Karadsheh et al. | 364/424.05 |
| 5,195,601 A | | 3/1993 | Voigt et al. | 180/79.1 |
| 5,200,911 A | * | 4/1993 | Ishikawa et al. | 701/39 |
| 5,224,042 A | | 6/1993 | Morrison | 364/424.05 |
| 5,295,550 A | * | 3/1994 | Chikuma | 180/412 |
| 5,346,030 A | * | 9/1994 | Ohmura et al. | 180/412 |
| 5,369,349 A | * | 11/1994 | Tsuchiya et al. | 318/811 |
| 6,041,886 A | * | 3/2000 | Nakaishi et al. | 180/443 |
| 6,073,067 A | * | 6/2000 | Fujiwara et al. | 180/410 |
| 6,332,506 B1 | * | 12/2001 | Kifuku | 180/404 |
| 6,371,239 B2 | * | 4/2002 | Furumi et al. | 180/404 |

OTHER PUBLICATIONS

Article on Control Systems, pp. 18.26, 18.27 and 18.28, from the "Automotive Electronics Handbook", Ronald K. Jurgen, Editor in Chief, copyright 1995 by McGraw–Hill, Inc.

* cited by examiner

Primary Examiner—Kevin Hurley
(74) Attorney, Agent, or Firm—Laura C. Hargitt

(57) ABSTRACT

A steering system for an automotive vehicle having two front wheels and two rear wheels is provided. The steering system includes a vehicle speed sensor; means for steering the front wheels at a desired steering angle; at least one steering angle sensor for sensing the steering angle of the front wheels; an axially displaceable rear rack, linked between the rear wheels, for steering the rear wheels at a determined steering angle; a centering resilient member, extending along the length of the rear rack, having a resiliency enabling the rear rack to return the rear wheels to a neutral steering angle position; a rear transmission mechanism connected to the rear rack; an actuator connected to the rear transmission mechanism for axially displacing the rear rack via the rear transmission mechanism against the resiliency of the centering resilient member; at least one steering angle sensor for sensing the steering angle of the rear wheels; an electronic control unit for determining a steering angle for the rear wheels from electric signals received from the vehicle speed sensor, each front wheels steering angle sensor, and each rear wheels steering angle sensor and for supplying an appropriate level of electric current to the actuator to thereby electrically empower the actuator to steer the rear wheels at the determined steering angle; and an electronic power regulation unit for selectively and electrically disabling the actuator according to electric signals received from the vehicle speed sensor, the level of the electric current supplied by the electronic control unit to the actuator, and a predetermined electric current limiting function.

5 Claims, 3 Drawing Sheets

VEHICLE STEERING SYSTEM WITH ELECTRONIC POWER REGULATION UNIT FOR LIMITING THE STEERING ANGLE OF REAR WHEELS AT HIGH SPEEDS

FIELD OF THE INVENTION

The present invention relates to a steering system for an automotive vehicle and, more particularly, to a rear wheel steering sub-system having fail-safe capability.

BACKGROUND OF THE INVENTION

In modern automotive vehicles having two front wheels and two rear wheels, the steering system incorporated therein sometimes includes a rear wheel steering sub-system in addition to a front wheel steering sub-system. By additionally including such a rear wheel steering sub-system, both the navigation of road turns and the execution of parking maneuvers can generally be executed more efficiently.

In modern automotive vehicles incorporating such a steering system, the front wheel steering sub-system typically includes a rotatable handwheel (commonly referred to as a "steering wheel") that is used by the vehicle operator or driver to steer the vehicle. This handwheel is linked to one end of a rotatable steering shaft. The other end of the rotatable steering shaft is typically linked to a front transmission mechanism. The front transmission mechanism may include, for example, a rack-and-pinion gear mechanism or a worm gear mechanism that converts any rotational movement of the handwheel and steering shaft into a back-and-forth linear motion that is applied via left and right front linkage assemblies to the two front wheels of the automotive vehicle. With such a configuration, a particular rotational movement of the handwheel is converted into a corresponding linear motion that is applied via the front linkage assemblies to the two front wheels for setting the two front wheels at a corresponding steering angle. In this way, the driver can manually apply torque to the handwheel and orient the handwheel in various desired rotated positions to thereby steer the two front wheels of the automotive vehicle at various desired corresponding steering angles.

The rear wheel steering sub-system in such a steering system typically includes, first of all, an electronic controller or control unit (ECU). The ECU is an expensive and complex unit that is program-controlled by software programs stored in a memory within and/or associated with the ECU. In addition to the ECU, the rear wheel steering sub-system also typically includes a vehicle speed sensor, at least one sensor for sensing the steering angle of the two front wheels, at least one sensor for sensing the steering angle of the two rear wheels, and an actuator which are all electrically connected to the ECU. The vehicle speed sensor serves to sense the speed of the automotive vehicle, and the actuator serves to mechanically actuate the rear wheel steering sub-system to set the two rear wheels at a determined steering angle. In such a configuration, the ECU receives electric signals from the vehicle speed sensor, each front wheels steering angle sensor, and each rear wheels steering angle sensor to compute and determine a safe and appropriate steering angle for the two rear wheels. Once an appropriate steering angle is determined in this way, the ECU electrically communicates and supplies an appropriate level of electric current to the actuator to thereby electrically empower the actuator, with the help of a rear transmission mechanism and left and right rear linkage assemblies, to mechanically situate the two rear wheels at the steering angle determined by the ECU.

Given such a rear wheel steering sub-system, if the ECU begins to malfunction, for example, due to a software "glitch" or the failure to detect and compensate for a malfunctioning sensor, the ECU may inadvertently dictate that the actuator steer the two rear wheels at a sharp steering angle even when the automotive vehicle is traveling at a high rate of speed. In such a situation, the vehicle may suddenly become uncontrollable.

To prevent such a situation from occurring, some automotive vehicle manufacturers have adopted a fail-safe strategy used by the aerospace industry in many modern aircraft and have included a similar strategy within the designs of the rear wheel steering sub-systems incorporated within their vehicles. In particular, the potential adverse effects of a malfunction in a critical system within a modern aircraft are guarded against by a cross-checking fail-safe strategy that requires the inclusion of redundant hardware, redundant and/or multiple electronic controllers, and safety critical software with electric signal redundancy within the aircraft design. Such a fail-safe strategy requiring redundant hardware and/or software with electric signal redundancy has been analogously implemented by some vehicle manufacturers within the designs of the rear wheel steering sub-systems incorporated within their vehicles. In general, however, such redundancy undesirably increases both the overall design complexity and the cost of manufacturing such rear wheel steering sub-systems and incorporating such sub-systems within automotive vehicles.

In light of the above, there is a present need in the art for a steering system including a rear wheel steering sub-system with fail-safe capability that has both a relatively simple design and an economical manufacturing cost.

SUMMARY OF THE INVENTION

The present invention provides a steering system for an automotive vehicle having two front wheels and two rear wheels. According to the present invention, the steering system basically includes, first of all, a speed sensor for sensing the speed of the vehicle, means for steering the two front wheels at a desired steering angle, one or more steering angle sensors for sensing the steering angle of the two front wheels, and an axially displaceable rear rack. The rear rack is linked between the two rear wheels and serves to steer the two rear wheels at a determined steering angle. In addition, the steering system also basically includes a centering resilient member extending along the length of the rack, a rear transmission mechanism connected to the rear rack, and an actuator connected to the rear transmission mechanism. The centering resilient member has a resiliency enabling the rear rack to return the two rear wheels to a neutral steering angle position. The actuator serves to axially displace the rear rack via the rear transmission mechanism against the resiliency of the centering resilient member. Furthermore, the steering system also basically includes one or more steering angle sensors for sensing the steering angle of the two rear wheels, an electronic control unit, and an electronic power regulation unit. The electronic control unit serves to determine a steering angle for the two rear wheels from electric signals received from the vehicle speed sensor, each front wheels steering angle sensor, and each rear wheels steering angle sensor. After doing so, the electronic control unit then supplies an appropriate level of electric current to the actuator to thereby electrically empower the actuator to steer the two rear wheels at the determined steering angle.

The electronic power regulation unit, on the other hand, serves to selectively and electrically disable the actuator according to electric signals received from the vehicle speed sensor, the level of the electric current supplied by the electronic control unit to the actuator, and a predetermined electric current limiting function.

In a preferred embodiment of the present invention, the front wheels steering means includes a rack-and-pinion gear front transmission mechanism, and the centering resilient member is a coil-type spring. In addition, the rear transmission mechanism is preferably a ball screw mechanism, and the actuator preferably includes a brushless, direct-current (DC) electric motor. Furthermore, the steering system preferably further includes a yaw rate sensor, a lateral acceleration sensor, sensors for sensing the rotational speeds of the two front wheels, and sensors for sensing the rotational speeds of the two rear wheels. The yaw rate sensor, the lateral acceleration sensor, the front wheels speed sensors, and the rear wheels speed sensors are preferably electrically connected to the electronic control unit such that the electronic control unit is capable of receiving electric signals therefrom and determining a safe and appropriate steering angle for the two rear wheels.

Also, in a preferred embodiment of the present invention, the electronic power regulation unit preferably includes an electronic comparator and an electronic controller. The electronic comparator is preferably electrically connected between the electronic control unit and the actuator. The electronic controller, on the other hand, is preferably electrically connected between the vehicle speed sensor and the electronic comparator. In such a configuration, the electronic controller is capable of receiving electric signals from the vehicle speed sensor, determining an electric current limit level according to the electric signals received from the vehicle speed sensor and the predetermined electric current limiting function, and transmitting an electric signal representative of the value of the electric current limit level to the electronic comparator. Also, in such a configuration, the electronic comparator is capable of receiving an electric signal representative of the value of the level of electric current supplied by the electronic control unit to the actuator, receiving the electric signal representative of the value of the electric current limit level, comparing the value of the level of the electric current and the value of the electric current limit level, and electrically disabling the actuator only when the value of the level of the electric current is greater than the value of the electric current limit level.

In general, the centering resilient member and the electronic power regulation unit together provide the steering system according to the present invention with rear wheel steering fail-safe capability with little or no hardware and software redundancy. As a result, the overall steering system according to the present invention has both a relatively simple design and an economical manufacturing cost. Furthermore, other advantages, design considerations, and applications of the present invention will become apparent to those skilled in the art when the detailed description of the best mode contemplated for practicing the invention, as set forth hereinbelow, is read in conjunction with the following drawings.

BRIEF DESCRIPTION OF THE DRAWINGS

A preferred, exemplary embodiment of the present invention will be described hereinbelow with reference to the following drawings.

DETAILED DESCRIPTION OF THE PREFERRED EMBODIMENT

Both the preferred structure and the preferred operation of the present invention are described in detail as set forth hereinbelow.

Figure 1:
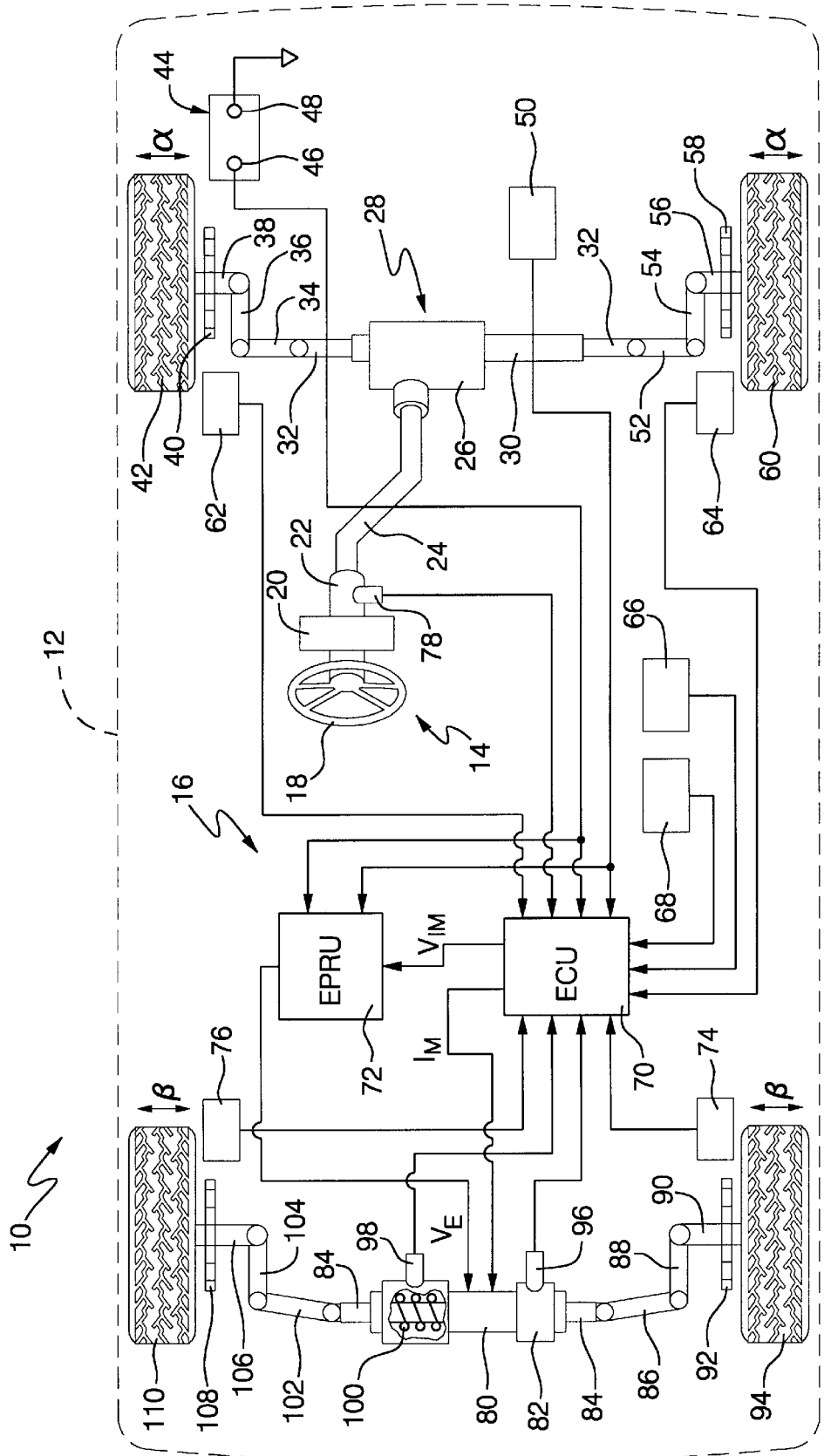
FIG. 1 is a top view of a steering system for an automotive vehicle having two front wheels and two rear wheels, wherein the steering system includes a rear wheel steering sub-system having an electronic control unit (ECU), an electronic power regulation unit (EPRU), and an actuator.

As illustrated in FIG. 1, the present invention provides a steering system 10 for an automotive vehicle 12 having two front wheels and two rear wheels. The two front wheels include both a left front wheel 42 and a right front wheel 60. The two rear wheels include both a left rear wheel 110 and a right rear wheel 94. The steering system 10 includes both a front wheel steering sub-system 14 and a rear wheel steering sub-system 16.

The front wheel steering sub-system 14 includes a rotatable handwheel 18 that is rotatably mounted on a first end of a steering column 22 protruding from a dash 20. The steering column 22 is mounted in the dash 20 such that a second end of the steering column 22 protrudes from the opposite side of the dash 20. The handwheel 18 is linked to a first end of a rotatable steering shaft 24 via the second end of the steering column 22. The rotatable steering shaft 24 also has a second end linked to a front transmission mechanism 28 situated within a gear housing 26. The front transmission mechanism 28 is connected to an axially displaceable front rack 32 having a first end and a second end which protrude from opposite ends of both the gear housing 26 and a rack housing 30 that is integrated with the gear housing 26. The front rack 32 is linked between the two front wheels of the automotive vehicle 12 such that the first end of the front rack 32 is linked to the left front wheel 42 with a left front linkage assembly, and the second end of the front rack 32 is linked to the right front wheel 60 with a right front linkage assembly. The left front linkage assembly includes a left front tie rod 34, a left front knuckle arm 36, and a left front axle shaft 38 which are interlinked with ball-and-socket joints to the first end of the front rack 32. The left front wheel 42 is rotatably mounted on the left front axle shaft 38. Similarly, the right front linkage assembly includes a right front tie rod 52, a right front knuckle arm 54, and a right front axle shaft 56 which are interlinked with ball-and-socket joints to the second end of the front rack 32. The right front wheel 60 is rotatably mounted on the right front axle shaft 58.

The front transmission mechanism 28 may include, for example, a rack-and-pinion gear mechanism, a worm gear mechanism, or any other mechanism that converts rotational movement of the handwheel and steering shaft into a back-and-forth linear movement of the front rack 32 between the two front wheels of the automotive vehicle 12. With such a configuration for the front wheel steering sub-system 14, a particular rotational movement of the handwheel 18 is converted into a corresponding linear movement of the front rack 32 that is applied via the left and right front linkage assemblies to the two front wheels for setting the two front wheels at a corresponding steering angle. In this way, a driver can manually apply torque to the handwheel 18 and orient the handwheel 18 in various desired rotated positions to thereby steer the two front wheels of the automotive vehicle 12 at various desired corresponding steering angles.

As further illustrated in FIG. 1, the rear wheel steering sub-system 16 includes, first of all, an axially displaceable rear rack 84 linked between the two rear wheels, a centering resilient member 100 extending along the length of the rear rack 84, a rear transmission mechanism 82 connected to the rear rack 84, and an actuator 80 connected to the rear transmission mechanism 82. With first regard to the rear rack 84, the rear rack 84 is linked between the two rear wheels of the automotive vehicle 12 such that a first end of the rear rack 84 is linked to the left rear wheel 110 with a left rear linkage assembly, and a second end of the rear rack 84 is linked to the right rear wheel 94 with a right rear linkage assembly. The left rear linkage assembly includes a left rear tie rod 102, a left rear knuckle arm 104, and a left rear axle shaft 106 which are interlinked with ball-and-socket joints to the first end of the rear rack 84. The left rear wheel 110 is rotatably mounted on the left rear axle shaft 106. Similarly, the right rear linkage assembly includes a right rear tie rod 86, a right rear knuckle arm 90, and a right rear axle shaft 90 which are interlinked with ball-and-socket joints to the second end of the rear rack 84. The right rear wheel 94 is rotatably mounted on the right rear axle shaft 90. In such a configuration, the rear rack 84 is utilized to steer the two rear wheels at various determined steering angles by axially displacing the rear rack 84.

The centering resilient member 100, situated and extending along the length of the rear rack 84, has a resiliency which predisposes and enables the rear rack 84 to return the two rear wheels to a neutral steering angle position. For the purpose of example, the two rear wheels, the left rear wheel 110 and the right rear wheel 94, are particularly illustrated in FIG. 1 in a neutral steering angle position. Preferably, the centering resilient member 100 is a spring, such as a coil-type spring. In the case of a coil-type spring, the spring may extend along the length of the rear rack 84 such that the spring is either coiled alongside or coiled about the rear rack 84. In FIG. 1, the centering resilient member 100 particularly illustrated therein is a coil-type spring which is coiled about the rear rack 84.

The rear transmission mechanism 82 is interconnected between the actuator 80 and the rear rack 84. The rear transmission mechanism 82 may include, for example, a ball screw mechanism, a rack-and-pinion gear mechanism, or any other mechanism that converts rotational movement produced by the actuator 80 into a back-and-forth linear movement of the rear rack 84 between the two rear wheels of the automotive vehicle 12. Thus, with the help of the rear transmission mechanism 82, rotational movement at a particular speed and torque produced by the actuator 80 is converted into a corresponding linear movement of the rear rack 84 that is applied via the left and right rear linkage assemblies to the two rear wheels for setting the two rear wheels at a corresponding steering angle.

The actuator 80 serves to axially displace the rear rack 84 via the rear transmission mechanism 82 against the resiliency of the centering resilient member 100. The particular extent to which the rear rack 84 is displaced against the resiliency and bias of the centering resilient member 100 is directly dependant upon the amount of torque produced by the actuator 80. In general, the amount of torque produced by the actuator 80 is proportional to the level of electric current ($I_M$) supplied to the actuator 80. Thus, for example, if the level of electric current ($I_M$) supplied to the actuator 80 is high, then the amount of torque produced by the actuator 80 will be correspondingly high. As a result, the extent to which the rear rack 84 is displaced against the resiliency of the centering resilient member 100 is greater than would be the case wherein a lower level of electric current is supplied to the actuator 80. In this way, the two rear wheels are set at a sharper steering angle by supplying a higher level of electric current to the actuator 80. If, on the other hand, the level of electric current ($I_M$) supplied to the actuator 80 is low, then the amount of torque produced by the actuator 80 will be correspondingly low. As a result, the extent to which the rear rack 84 is displaced against the resiliency of the centering resilient member 100 is less than would be the case wherein a higher level of electric current is supplied to the actuator 80. In this way, the two rear wheels are set at only a slight steering angle by supplying a low level of current to the actuator 80. Lastly, if the level of electric current ($I_M$) supplied to the actuator 80 is negligible or zero, then the amount of torque produced by the actuator 80 will then be negligible or zero as well. In such a case, the resiliency of the centering resilient member 100 enables the rear rack 84 to return to a centered position such that the two rear wheels are correspondingly returned to a neutral steering angle position as particularly illustrated in FIG. 1.

Figure 2:
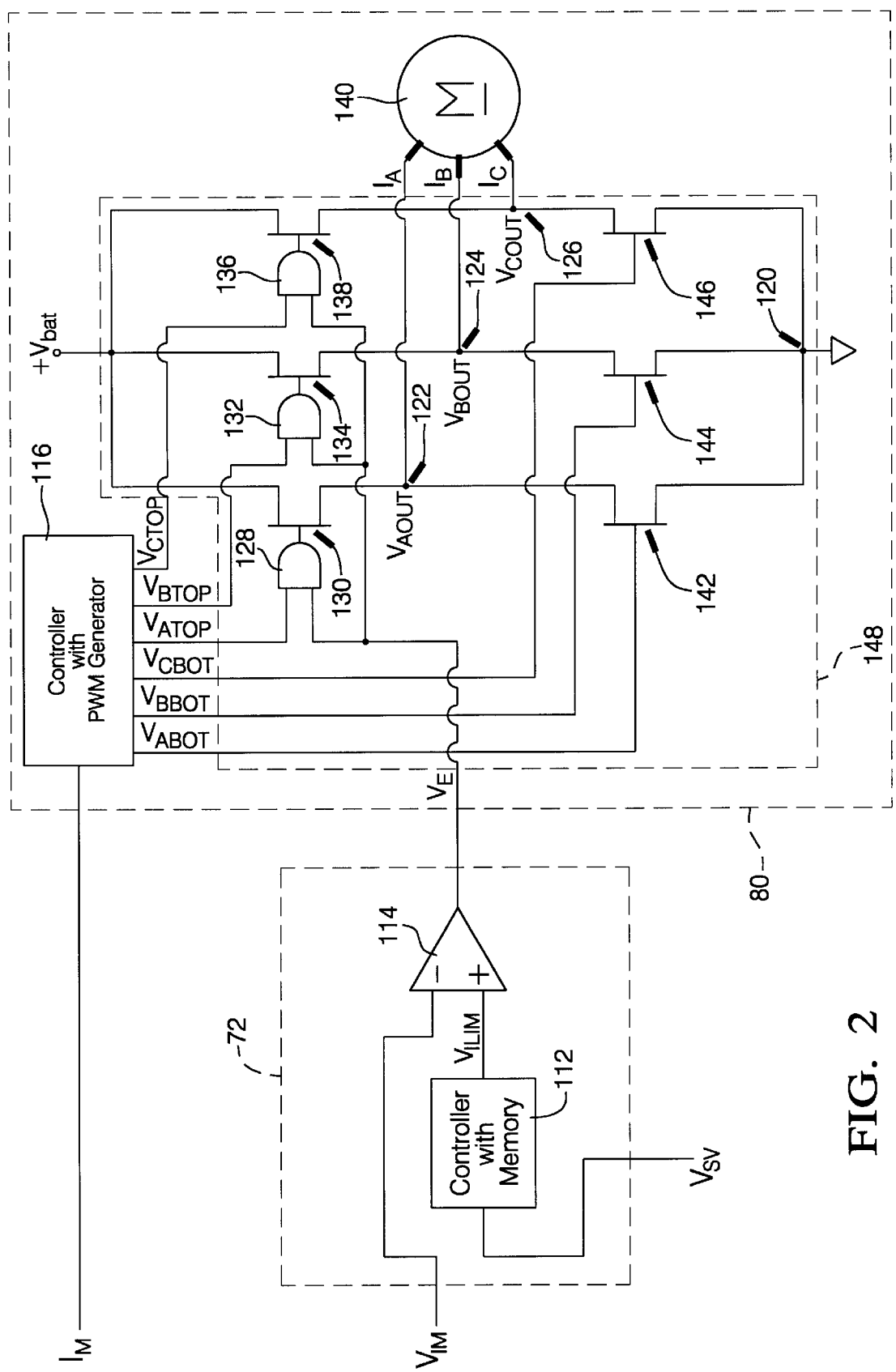
FIG. 2 is an electric circuit diagram highlighting both the electronic power regulation unit and the actuator of FIG. 1.

As illustrated in FIG. 2, a preferred embodiment of the actuator 80 includes a brushless, direct-current (DC) electric motor (BLM) 140, an electronic power stage 148 electrically connected to the motor 140, and an electronic controller 116 electrically connected to the power stage 148. The motor 140 is physically connected or linked (not shown in FIG. 2) to the rear transmission mechanism 82. The motor 140 serves to actuate the rear transmission mechanism 82 and the rear rack 84 against the resiliency of the centering resilient member 100 by applying rotational movement with torque to the transmission mechanism 82. In this way, the motor 140 ultimately serves to axially displace the rear rack 84 and thereby steer the two rear wheels.

The electronic power stage 148 is electrically connected to the motor 140 and generally serves to provide electric power for operating the motor 140. Electric power provided by the power stage 148 is supplied to the motor 140 in the form of three direct-current (DC) phase currents $I_A$, $I_B$, and $I_C$. The power stage 148 comprises six n-channel field-effect transistors (FETs) 130, 134, 138, 142, 144, and 146 which are connected in three half H-bridge configuration stages adapted for the present invention. Each half H-bridge stage is responsible for supplying a different one of the three phase currents to the motor 140. The FETs 130, 134, and 138 are configured as "top" switching elements, and the FETs 142, 144, and 146 are configured as "bottom" switching elements. More particularly, the drains of the FETs 130, 134, and 138 are all electrically connected to a circuit node 118. The source of the FET 130 is electrically connected to an output circuit node 122, the source of the FET 134 is electrically connected to an output circuit node 124, and the source of the FET 138 is electrically connected to an output circuit node 126. In addition, the sources of the FETs 142, 144, and 146 are all electrically connected to a circuit node 120. The drain of the FET 142 is electrically connected to the output node 122, the drain of the FET 144 is electrically connected to the output node 124, and the drain of the FET 146 is electrically connected to the output node 126. The node 118 is electrically connected to a fixed-level, direct-current (DC) positive voltage source (+$V_{BAT}$) which is derived from voltage power supplied by a direct-current (DC) automotive battery 44 situated within the automotive vehicle 12. In contrast, the node 120 is electrically connected to an electrical ground such as, for example, chassis ground.

In general, the electronic controller 116 receives and senses the level of the electric current $I_M$ supplied to the actuator 80 for controlling and operating the motor 140. The controller 116 includes a pulse-width modulation (PWM) generator for generating six PWM DC voltage control signals $V_{ATOP}$, $V_{BTOP}$, $V_{CTOP}$, $V_{ABOT}$, $V_{BBOT}$, and $V_{CBOT}$ which serve to control the switching states of the top and bottom switching elements in the power stage 148. These six control signals are particularly based on the sensed level of the electric current $I_M$ supplied to the actuator 80. The "top" signals $V_{ATOP}$, $V_{BTOP}$, and $V_{CTOP}$ are electrically communicated via electrical conductor connections from the controller 116 to three electronic logical-AND gates 128, 132, and 136 which are associated with the top switching elements. More particularly, the control signal $V_{ATOP}$ is electrically communicated to a first input of the AND gate 128, the control signal $V_{BTOP}$ is electrically communicated to a first input of the AND gate 132, and the control signal $V_{CTOP}$ is electrically communicated to a first input of the AND gate 136. A second input of the AND gate 128, a second input of the AND gate 132, and a second input of the AND gate 136 are all electrically connected (shorted) together for receiving a common enabling/disabling DC voltage signal $V_E$. Furthermore, the output of the AND gate 128 is electrically connected to the gate of the FET 130, the output of the AND gate 132 is electrically connected to the gate of the FET 134, and the output of the AND gate 136 is electrically connected to the gate of the FET 138. In contrast to the top control signals, the "bottom" control signals $V_{ABOT}$, $V_{BBOT}$, and $V_{CBOT}$ are electrically communicated via electrical conductor connections from the controller 116 to the gates of the bottom switching elements. More particularly, the control signal $V_{ABOT}$ is electrically communicated to the gate of the FET 142, the control signal $V_{BBOT}$ is electrically communicated to the gate of the FET 144, and the control signal $V_{CBOT}$ is electrically communicated to the gate of the FET 146.

Given such a configuration within the actuator 80, the voltage levels of the PWM control signals $V_{ATOP}$, $V_{BTOP}$, $V_{CTOP}$, $V_{ABOT}$, $V_{BBOT}$, and $V_{CBOT}$ are generally modulated back-and-forth between a high voltage level and a low voltage level at a particular duty cycle and/or frequency which generally corresponds with the particular level of the electric current $I_M$ being supplied to the actuator 80 and received by the controller 116 at a given point in time. In general, a top control signal for a top switching element and a bottom control signal for a bottom switching element in a given stage will have high and low voltage levels at different times from each other so that, whenever the voltage level of the voltage signal $V_E$ is high (i.e., enabling), the top switching element and the bottom switching element will be in alternatingly opposite switching states. In this way, the output node associated with the given stage will generally be alternatingly electrically connected to the node 118 and electrically connected to the node 120. Thus, the output voltage associated with that output node will correspondingly modulate and alternatingly be charged to a high voltage level via the node 118 and be discharged to a low voltage level via the node 120. As a result, the level of the phase current associated with that output voltage will correspondingly modulate and thereby affect and help control the operation of the motor 140 and the torque produced thereby.

Although it is ideally and generally true that a top control signal and a bottom control signal for a given stage are assigned by the controller 116 with opposite voltage levels at a given point in time, it is to be understood that the controller 116 may momentarily and simultaneously assign both the top control signal and the bottom control signal with a low voltage level before the voltage levels of the control signals are both fully reversed for a duty cycle voltage transition. Such a brief moment wherein both the top control signal and the bottom control signal are assigned and have low voltage levels is conventionally referred to as "deadtime." By inserting deadtime in this way, the controller 116 thereby prevents a situation wherein both the top control signal and the bottom control signal both have high voltage levels and both the top switching element and the bottom switching element are simultaneously forced into current conducting states (when $V_E$ is high) such that "shoot-through" electric current is permitted to pass directly from the node 118 to the node 120 and potentially cause electrical damage to the actuator 80.

When, however, the voltage level of the voltage signal $V_E$ is low (i.e., disabling), the FET 130, the FET 134, and the FET 138 (i.e., the top switching elements) are prevented from being forced into current conducting states, regardless of the voltage levels assigned by the controller 116 to the top control signals $V_{ATOP}$, $V_{BTOP}$, and $V_{CTOP}$. Such is due to the three logical-AND gates 128, 132, and 136. Thus, the DC output voltages $V_{AOUT}$, $V_{BOUT}$, and $V_{COUT}$ associated with the output nodes 122, 124, and 126 are forced to remain at low voltage levels and are prevented from being charged to high voltage levels via the top switching elements. As a result, the three phase currents $I_A$, $I_B$, and $I_C$ associated with the three output voltages $V_{AOUT}$, $V_{BOUT}$, and $V_{COUT}$ are forced to remain at low (zero) current levels, thereby effectively electrically disabling and turning off the motor 140.

In sum, with regard to the actuator 80, when the voltage level of the voltage signal $V_E$ is high, the actuator 80 is thereby electrically enabled. As a result, the controller 116 is free to operate and control the motor 140, as well as the actuating torque produced thereby, in accordance with the particular level of the electric current $I_M$ supplied to the actuator 80 and sensed by the controller 116. In contrast, when the voltage level of the voltage signal $V_E$ is low, the actuator 80 is thereby electrically disabled. As a result, the motor 140 is turned off, and the controller 116 is altogether prevented from operating and controlling the motor 140, regardless of the particular level of the electric current $I_M$.

In addition to the above, the rear wheel steering subsystem 16 also includes a speed sensor 50 for sensing the speed of the automotive vehicle 12, a handwheel steering angle sensor 78 for sensing the steering angle of the two front wheels, a sensor 66 for sensing the yaw rate of the vehicle 12, a sensor 68 for sensing the lateral acceleration of the vehicle 12, a main sensor 96 for sensing the steering angle of the two rear wheels, a sub sensor 98 for sensing the steering angle of the two rear wheels, sensors for sensing the rotational speeds of the two front wheels, and sensors for sensing the rotational speeds of the two rear wheels. The handwheel steering angle sensor 78 is particularly situated and mounted within the steering column 22. In addition to the handwheel steering angle sensor 78, it is to be understood that a steering angle sensor (not shown) may be situated and mounted in the gear housing 26 of the front transmission mechanism 28 to serve as additional or alternative means for sensing the steering angle of the two front wheels. The main sensor 96, on the other hand, is situated and mounted proximate the rear transmission mechanism 82, whereas the sub sensor 98 is situated and mounted proximate the rear rack 84 and the centering resilient member 100.

The sensors for sensing the rotational speeds of the two front wheels include a left front wheel speed sensor 62, associated with the left front wheel 42, and a right front wheel speed sensor 64, associated with the right front wheel 60. The sensors for sensing the rotational speeds of the two rear wheels include a left rear wheel speed sensor 76, associated with the left rear wheel 110, and a right rear wheel speed sensor 74, associated with the right rear wheel 94. The left front wheel speed sensor 62 is fixedly situated within the automotive vehicle 12 and is spaced away (by an "air gap") from a left front toothed rotor (sometimes referred to as a "trigger wheel") 40 which is rotatably mounted on the left front axle shaft 38. More particularly, the left front toothed rotor 40 is rotatably mounted on the left front axle shaft 38 such that the left front toothed rotor 40 rotates along with and at the same speed as the left front wheel 42. In such a configuration, as the vehicle 12 travels along a drive path and both the left front wheel 42 and the left front toothed rotor 40 rotate together accordingly, a voltage is electromagnetically induced in the left front wheel speed sensor 62 as the teeth of the left front toothed rotor 40 rotate past the fixedly situated left front wheel speed sensor 62. The amplitude and frequency of the voltage induced in the left front wheel speed sensor 62 directly correspond to the rotational (angular) speed of the left front toothed rotor 40. In this way, the rotational speed of the left front wheel 42 is sensed vicariously via the rotation of the left front toothed rotor 40. The right front wheel speed sensor 64, associated with the right front wheel 60, operates similarly in combination with a right front toothed rotor 58 rotatably mounted on the right front axle shaft 56. In addition, the left rear wheel speed sensor 76, associated with the left rear wheel 110, also operates similarly in combination with a left rear toothed rotor 108 rotatably mounted on the left rear axle shaft 106. Lastly, the right rear wheel speed sensor 74, associated with the right rear wheel 94, also operates similarly in combination with a right rear toothed rotor 92 rotatably mounted on the right rear axle shaft 90.

Further, in addition to the above, the rear wheel steering sub-system 16 also includes an electronic control unit (ECU) 70 as illustrated in FIG. 1. The ECU 70 is program-controlled by software programs stored in an electronic memory within and/or associated with the ECU 70. Voltage power for successfully operating the ECU 70 is supplied by the direct-current (DC) automotive battery 44 which is situated within the automotive vehicle 12. The battery 44 has a positive terminal 46 and a negative terminal 48 and is electrically connected to the ECU 70. In addition to the battery 44, the ECU 70 is also electrically connected to the vehicle speed sensor 50, the left front wheel speed sensor 62, the right front wheel speed sensor 64, the handwheel steering angle sensor 78, the yaw rate sensor 66, the lateral acceleration sensor 68, the left rear wheel speed sensor 76, the right rear wheel speed sensor 74, the main sensor 96, the sub sensor 98, and the actuator 80. In such a configuration, the ECU 70 receives electric signals from the vehicle speed sensor 50, the left front wheel speed sensor 62, the right front wheel speed sensor 64, the handwheel steering angle sensor 78, the yaw rate sensor 66, the lateral acceleration sensor 68, the left rear wheel speed sensor 76, the right rear wheel speed sensor 74, the main sensor 96, and the sub sensor 98 in order to compute and determine a safe and appropriate steering angle for the two rear wheels. Once an appropriate steering angle is determined in this way, the ECU 70 electrically communicates and supplies an appropriate level of electric current ($I_M$) to the controller 116 of the actuator 80 to thereby electrically empower the actuator 80, with the help of the rear transmission mechanism 82, the rear rack 84, and the left and right rear linkage assemblies, to mechanically situate the two rear wheels at the steering angle determined by the ECU 70. The electric signals received from both the main sensor 96 and the sub sensor 98 particularly serve as feedback information for helping to inform the ECU 70 as to the actual steering angle of the two rear wheels. With such feedback information, the ECU 70 can make appropriate adjustments so that the actual steering angle of the two rear wheels is eventually mechanically realized and brought in sufficient conformity with the computed steering angle.

In computing and determining a safe and appropriate steering angle for the two rear wheels, if the two front wheels are steered by a driver at a desired steering angle which is extreme or sharp, the ECU 70 in response will generally dictate that the two rear wheels be correspondingly steered at a sharp steering angle as long as the automotive vehicle 12 is travelling at a slow rate of speed. In this way, for example, the slow-speed navigation of a sharp road turn or the slow-speed execution of a sharp parking maneuver is greatly facilitated without compromising the safety of the driver. On the other hand, if the two front wheels are steered by a driver at a steering angle which is relatively sharp while the vehicle 12 is travelling at a relatively high rate of speed, the ECU 70 in response will generally dictate that the two rear wheels be correspondingly steered only in a limited fashion at, for example, a limited (slight) steering angle. In this way, sufficient control of the vehicle 12 is maintained and the safety of the driver is ensured. In an extreme situation wherein the two front wheels are steered at an extremely sharp angle while the vehicle is travelling at an extremely high rate of speed, the ECU 70 in response will dictate that the steering capability of the two rear wheels be completely limited by setting the level of the electric current $I_M$ at a negligible level or even zero so that the actuator 80 produces negligible to no output torque. In such a situation, the resiliency of the centering resilient member 100 will ensure that the rear rack 84 along with the two rear wheels are forced to remain in a neutral steering angle position. In this way, control of the vehicle 12 and the safety of the driver is attempted to be maintained.

Still further, in addition to the above, the rear wheel steering sub-system 16 also includes an electronic power regulation unit (EPRU) 72. The EPRU 72, in combination with the centering resilient member 100, serves to provide the steering system 10 with fail-safe capability if or when the ECU 70 begins to malfunction. For example, due to a software "glitch" or the failure to detect and compensate for a malfunctioning sensor, the ECU 70 may inadvertently dictate that the actuator 80 steer the two rear wheels at a sharp steering angle even when the automotive vehicle 12 is traveling at a high rate of speed. In such a situation, the vehicle 12 may suddenly become uncontrollable. To prevent such a situation from occurring, the EPRU 72 selectively and electrically disables the actuator 80 according to electric signals received from the vehicle speed sensor 50, the level of electric current ($I_M$) supplied by the ECU 70 to the actuator 80, and a predetermined electric current limiting function (see FIG. 3).

As illustrated in FIG. 2, the EPRU 72 includes an electronic comparator 114, electrically connected between the ECU 70 and the power stage 148 of the actuator 80, and an electronic controller 112, electrically connected between the vehicle speed sensor 50 and the comparator 114. The comparator 114 comprises an electronic operational amplifier (op-amp) having an inverting input, a non-inverting input, and an output. The inverting input of the op-amp is electrically connected to the ECU 70, and the non-inverting input of the op-amp is electrically connected to the controller 112. The output of the op-amp is electrically connected to the power stage 148 of the actuator 80. The electronic controller 112, on the other hand, includes an electronic memory wherein the predetermined electric current limiting function (see FIG. 3) is electrically stored. The controller 112 includes an input, electrically connected to the vehicle speed sensor 50, and an output, electrically connected to the non-inverting input of the op-amp.

Given such a configuration, the electronic controller 112 is capable of receiving an electric voltage signal ($V_{SV}$) from the vehicle speed sensor 50 which is representative of the speed ($s_V$) of the automotive vehicle 12. Upon receiving the electric voltage signal $V_{SV}$, the controller 112 is then capable of determining an electric current limit level ($I_{LIM}$) based on the speed ($s_V$) of the vehicle 12 as dictated by the predetermined electric current limiting function (see FIG. 3) stored in memory within the controller 112. After determining the electric current limit level $I_{LIM}$, the controller 112 is then capable of transmitting an electric voltage signal ($V_{ILIM}$) to the non-inverting input of the op-amp which is representative of the value of the electric current limit level $I_{LIM}$.

Furthermore, in such a configuration, the inverting input of the op-amp is capable of receiving an electric voltage signal ($V_{IM}$) from the ECU 70 that is representative of the value of the level of the electric current ($I_M$) supplied by the ECU 70 to the actuator 80. In addition, the non-inverting input of the op-amp is capable of receiving the electric voltage signal ($V_{ILIM}$) transmitted from the controller 112 which is representative of the value of the electric current limit level ($I_{LIM}$) dictated by the predetermined electric current limiting function. Once both the electric voltage signal $V_{IM}$ and the electric voltage signal $V_{ILIM}$ are received by the op-amp (i.e., the comparator 114), the voltage level values of the two electric voltage signals are compared in such a way that the electric voltage signal $V_{ILIM}$ is used as the reference voltage for purposes of the comparison. Given that the op-amp is electrically connected in an "inverting" configuration, the enabling/disabling voltage signal $V_E$ produced at the op-amp output will have a high (enabling) voltage level whenever the value of the electric voltage signal $V_{ILIM}$ is determined to be greater than the value of the electric voltage signal $V_{IM}$. On the other hand, whenever the value of the electric voltage signal $V_{IM}$ is determined to be greater than the value of the electric voltage signal $V_{ILIM}$, the enabling/disabling voltage signal $V_E$ produced at the op-amp output will instead have a low (disabling) voltage level. Thereafter, the comparator 114 is capable of transmitting the electric voltage signal $V_E$ to the power stage 148 of the actuator 80 to thereby electrically enable the actuator 80 if the voltage level of electric voltage signal $V_E$ is high or to thereby electrically disable the actuator 80 if the voltage level of the electric voltage signal $V_E$ is instead low.

Figure 3:
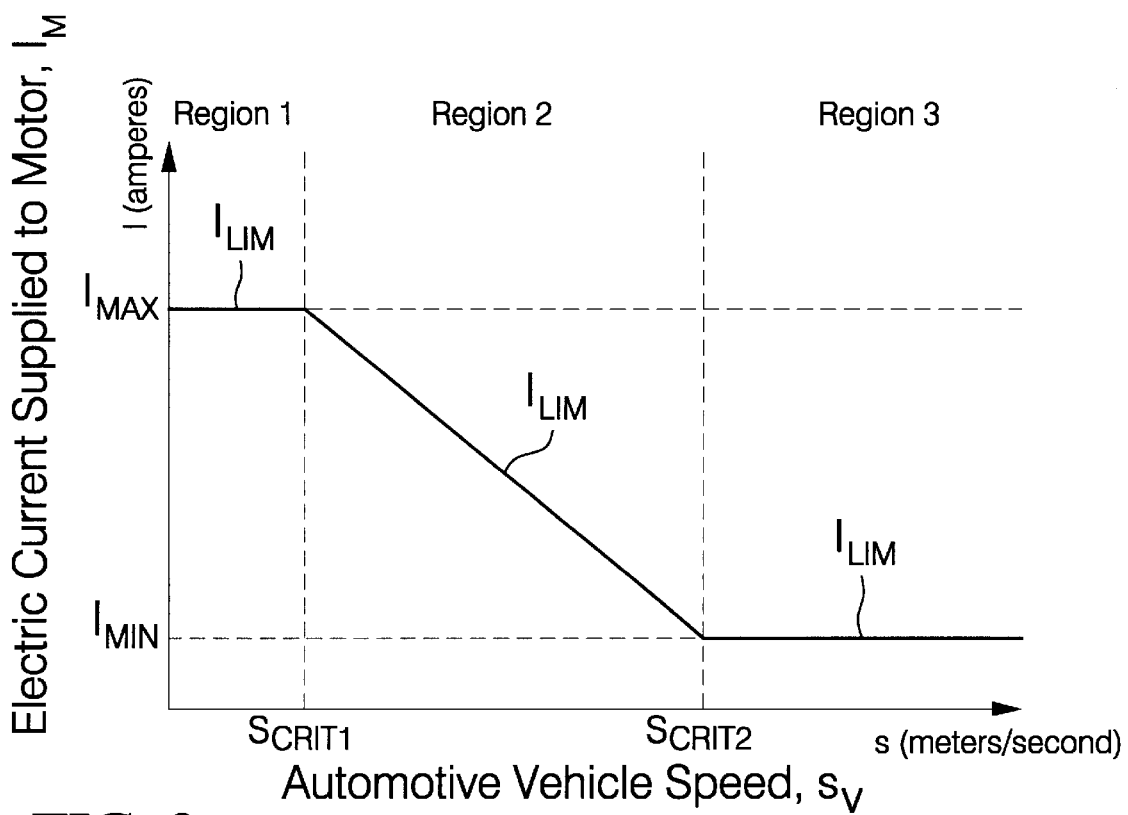
FIG. 3 is a graph of a predetermined electric current limiting function utilized by the electronic power regulation unit of FIG. 1 in selectively and electrically disabling the actuator of FIG. 1.

FIG. 3 is a graph of the predetermined electric current limiting function stored in the memory of the electronic controller 112 of the EPRU 72. The electric current limiting function is utilized, in combination with the comparator 114, by the EPRU 72 to selectively and electrically disable the actuator 80 whenever the ECU 70 inadvertently dictates, presumably due to malfunction, that the two rear wheels be unsafely steered at an sharp steering angle when the automotive vehicle 12 is travelling at a high rate of speed. In this way, when the actuator 80 is disabled by the EPRU 72, the resiliency of the centering resilient member 100 forces both the rear rack 84 and the two rear wheels to remain in a neutral steering angle position. As illustrated in FIG. 3, the electric current limiting function dictates an electric current limit level $I_{LIM}$ that is not to be exceeded by the level of the electric current $I_M$ supplied by the ECU 70 to the actuator 80. More particularly, whenever the comparator 114 of the EPRU 72 determines that the value of the level of the electric current $I_M$ (represented by the voltage signal $V_{IM}$) is greater than the value of the electric current limit level $I_{LIM}$ (represented by $V_{ILIM}$) for the vehicle speed $s_v$ (represented by the voltage signal $V_{sv}$) at a particular point in time, the EPRU 72 will then disable the actuator 80 by setting the voltage signal $V_E$ at a low voltage level. On the other hand, whenever the comparator 114 determines that the value of the level of the electric current $I_M$ is less than the value of the electric current limit level $I_{LIM}$ for the vehicle speed $s_v$ at a particular point in time, the EPRU 72 will then enable the actuator 80 by setting the voltage signal $V_E$ at a high voltage level. By enabling the actuator 80 in this way, the EPRU 72 thereby freely permits the actuator 80 to steer the two rear wheels at a steering angle which directly corresponds to the particular level of the electric current $I_M$ supplied by the ECU 70 to the actuator 80.

As particularly illustrated in FIG. 3, the electric current limiting function varies the value of the electric current limit level $I_{LIM}$ from a maximum current value $I_{MAX}$ to a minimum current value $I_{MIN}$ as the vehicle speed $s_V$ increases. The maximum current value $I_{MAX}$ generally corresponds with the maximum level of the electric current $I_M$ that can ever be supplied by the ECU 70 to the actuator 80 for steering the two rear wheels. The minimum current value $I_{MIN}$ generally corresponds to the particular threshold level of electric current $I_M$ at which the actuator 80 is just able to produce enough output torque to begin to overcome the resiliency of the centering resilient member 100 and thereby steer the rear rack 84 along with the two rear wheels away from the neutral steering angle position. Furthermore, inflections in the value of the electric current limit level $I_{LIM}$ at a first critical vehicle threshold speed $s_{CRIT1}$ and at a second critical vehicle threshold speed $s_{CRIT2}$ serve to delineate three different regions (or modes) of operation for the EPRU 72. These three different regions (region 1, region 2, and region 3) of operation will be described hereinbelow.

In region 1, since the value of the electric current limit level $I_{LIM}$ generally corresponds with the maximum current value $I_{MAX}$ which, in turn, generally corresponds with the maximum level of the electric current $I_M$ that can ever be supplied by the ECU 70 to the actuator 80 for steering the two rear wheels, the EPRU 72 then generally never disables the actuator 80 when the automotive vehicle 12 is travelling at a speed $s_V$ which is less than the first critical vehicle threshold speed $s_{CRIT1}$. Such is the case because the ECU 70, by its own inherent design, is generally incapable of supplying a level of electric current $I_M$ that exceeds the electric current limiting level $I_{LIM}$ in region 1. As a result, when operating in region 1, the actuator 80 is able to freely steer the two rear wheels at a steering angle that directly corresponds to the particular level of the electric current $I_M$ supplied by the ECU 70 to the actuator 80.

In region 2, since the value of the electric current limit level $I_{LIM}$ decreases below the maximum current value $I_{MAX}$ as the vehicle speed $s_v$ increases, it is therefore possible for the value of the level of the electric current $I_M$, as dictated by the ECU 70, to be greater than the value of the electric current limit level $I_{LIM}$ at a given vehicle speed $s_V$ at a particular point in time. Thus, in region 2, whether the EPRU 72 will disable the actuator 80 at a given vehicle speed $s_v$ at a particular point in time directly depends on whether the value of the electric current $I_M$ is determined to be greater than the value of the electric current limit level $I_{LIM}$. If the value of the electric current $I_M$ dictated by the ECU 70 is determined to be less than the value of the electric current limit level $I_{LIM}$, then the EPRU 72 will not disable the actuator 80. As a result, the actuator 80 is able to freely steer the two rear wheels at a steering angle that directly corresponds to the particular level of the electric current $I_M$ supplied by the ECU 70 to the actuator 80. On the other hand, if the value of the electric current $I_M$ dictated by the ECU 70 is determined to be greater than the value of the electric current limit level $I_{LIM}$, then the EPRU 72 will disable the actuator 80 by setting the voltage signal $V_E$ at a low voltage level. When the actuator 80 is disabled in this way, the motor 140 is effectively turned off so that no output torque is produced. As a result, the resiliency of the centering resilient member 100 forces the rear rack 84 along with the two rear wheels to be situated in a neutral steering angle position. If, while the vehicle speed sv remains somewhere between the first critical vehicle threshold speed $s_{CRIT1}$ and the second critical vehicle threshold speed $s_{CRIT2}$, the ECU 70 sometime thereafter dictates a value for the electric current $I_M$ which is determined to be less than the value of the electric current limit level $I_{LIM}$, the EPRU 72 will then enable the actuator 80 by setting the voltage signal $V_E$ at a high voltage level. As a result, the actuator 80 is again able to freely steer the two rear wheels at a steering angle that directly corresponds to the particular level of the electric current $I_M$ supplied by the ECU 70 to the actuator 80.

In region 3, since the value of the electric current limit level $I_{LIM}$ generally corresponds with the minimum current value $I_{MIN}$ which, in turn, generally corresponds to the particular threshold level of electric current $I_M$ at which the actuator 80 is just able to produce enough output torque to begin to overcome the resiliency of the centering resilient member 100, the EPRU 72 thereby ensures that the rear rack 84 along with the two rear wheels are always forced, by the resiliency of the centering resilient member 100, to be situated in a neutral steering angle position. That is, as long as the automotive vehicle 12 is travelling at a rate of speed $s_V$ which is higher than the second critical vehicle threshold speed $s_{CRIT2}$, the two rear wheels are forced to remain in a neutral steering angle position to facilitate the safe control of the vehicle 12 at high speeds. More particularly, in region 3, if the value of the electric current $I_M$ dictated by the ECU 70 is determined to be greater than the value of the electric current limit level $I_{LIM}$, then the EPRU 72 will disable the actuator 80. As a result, the motor 140 is turned off, and the two rear wheels are thereby forced to stay in a neutral steering angle position. Alternatively, if the level of the electric current $I_M$ is so low such that the value level of the electric current $I_M$ is determined to be less than the value of the electric current limit level $I_{LIM}$, then the EPRU 72 will not disable the actuator 80. Thus, the motor 140 will be on in such a case. However, since the level of the electric current $I_M$ dictated by the ECU 70 is so low, as in the case where a driver has purposely manipulated the handwheel 18 such that the two front wheels are in a substantially neutral steering angle position, the corresponding negligible amount of output torque produced by the motor 140 fails to overcome the resiliency of the centering resilient member 100. As a result, the rear rack 84 along with the two rear wheels are forced to remain in a neutral steering angle position.

Figure 4:
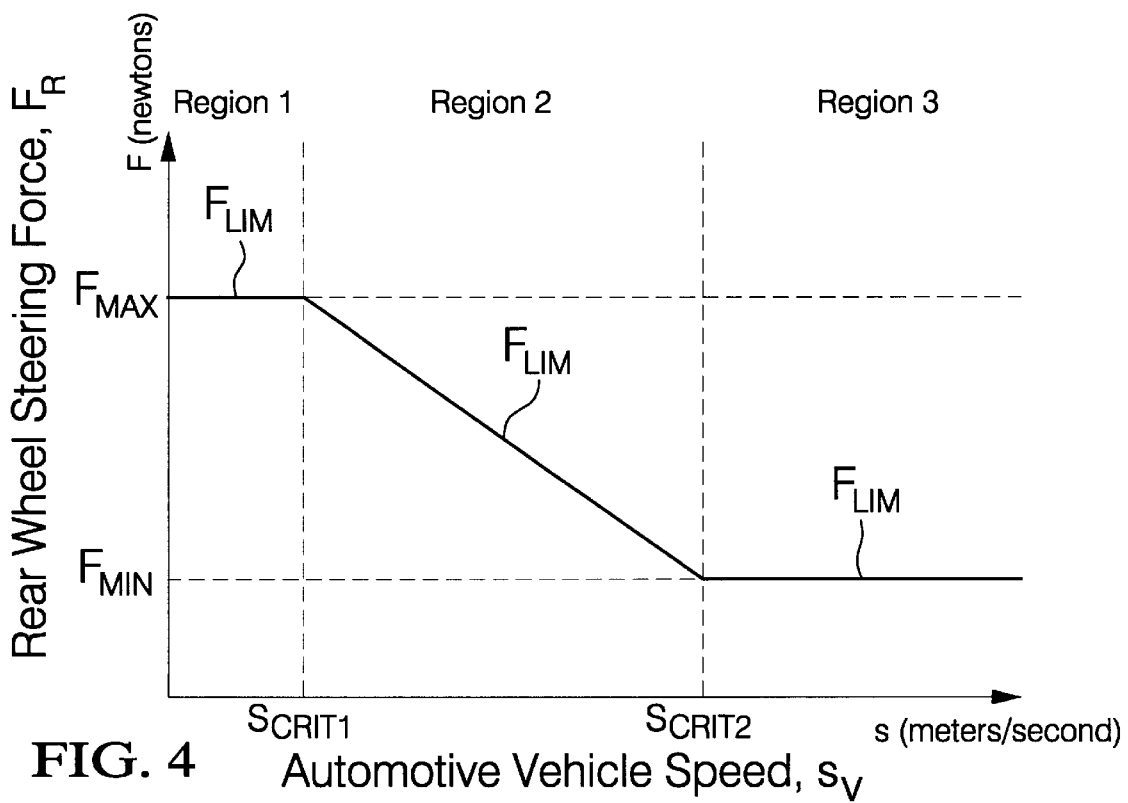
FIG. 4 is a graph of the upper limit of rear wheel steering force that can be applied by the actuator of FIG. 1 as dictated by the predetermined electric current limiting function of FIG. 3.

For further illustrative purposes, FIG. 4 is a graph of the rear wheel steering force limit level $F_{LIM}$ for rear wheel steering force $F_R$ that is applied by the actuator 80 to the left and right rear linkage assemblies via the rear transmission mechanism 82 and the rear rack 84. The maximum rear wheel steering force value $F_{MAX}$ is the maximum possible steering force that can be applied to the rear linkage assemblies when the value of the electric current $I_M$, as dictated by the ECU 70, approaches or coincides with the maximum current value $I_{MAX}$. The minimum rear wheel steering force value $F_{MIN}$ is the threshold rear wheel steering force at which the resiliency of the centering resilient member 100 can just begin to be counteracted and the two rear wheels can be moved from a neutral steering angle position. This minimum rear wheel steering force value $F_{MIN}$ corresponds with the minimum current value $I_{MIN}$ and is applied to the rear linkage assemblies when the value of the electric current $I_M$, as dictated by the ECU 70, approaches or coincides with the minimum current value $I_{MIN}$.

In general, the electronic power regulation unit (EPRU) 72, in combination with the centering resilient member 100, provides the steering system 10 according to the present invention with rear wheel steering fail-safe capability with little or no hardware and software redundancy. As a result, the steering system 10 according to the present invention has a relatively simple design and is therefore economical to manufacture.

While the present invention has been described in what is presently considered to be the most practical and preferred embodiment and/or implementation, it is to be understood that the invention is not to be limited to the disclosed embodiment, but on the contrary, is intended to cover various modifications and equivalent arrangements included within the scope of the appended claims, which scope is to be accorded the broadest interpretation so as to encompass all such modifications and equivalent structures as is permitted under the law.

I claim:

1. A steering system for an automotive vehicle having two front wheels and two rear wheels, said steering system comprising:

a speed sensor for sensing the speed of said vehicle;

means for steering said two front wheels at a desired steering angle;

at least one steering angle sensor for sensing the steering angle of said two front wheels;

an axially displaceable rear rack, linked between said two rear wheels, for steering said two rear wheels at a determined steering angle;

a centering resilient member, extending along the length of said rear rack, having a resiliency enabling said rear rack to return said two rear wheels to a neutral steering angle position;

a rear transmission mechanism connected to said rear rack;

an actuator connected to said rear transmission mechanism for axially displacing said rear rack via said rear transmission mechanism against said resiliency of said centering resilient member;

at least one steering angle sensor for sensing the steering angle of said two rear wheels;

an electronic control unit capable of determining a steering angle for said two rear wheels from electric signals received from said vehicle speed sensor, each said font wheels steering angle sensor, and each said rear wheels steering angle sensor and capable of supplying a level of electric current to said actuator to thereby electrically empower said actuator to steer said two rear wheels at said determined steering angle; and an electronic power regulation unit capable of selectively and electrically disabling said actuator according to electric signals received from said vehicle speed sensor, said level of said electric current supplied by said electronic control unit to said actuator, and a predetermined electric current limiting function;

wherein said actuator comprises a brushless, direct-current electric motor for actuating said rear transmission mechanism to axially displace said rear rack and thereby steer said two rear wheels;

an electronic power stage, electrically connected between said electronic power regulation unit and said motor, for providing electric power to operate said motor as electrically enabled by said electronic power regulation unit; and an electronic controller, electrically connected between said electronic control unit and said electronic power stage, capable of generating pulse-width modulated electric control signals based on said level of said electric current supplied by said electronic control unit to said actuator and capable of transmitting said generated electric control signals to said electronic power stage to ultimately control said motor and the actuating torque produced thereby; and wherein said electronic power stage comprises six field-effect transistors connected in three half H-bridge configuration stages.

2. A steering system for an automotive vehicle having two front wheels and two rear wheels, said steering system comprising:

a speed sensor for sensing the speed of said vehicle;

means for steering said two front wheels at a desired steering angle;

at least one steering angle sensor for sensing the steering angle of said two front wheels;

an axially displaceable rear rack, linked between said two rear wheels, for steering said two rear wheels at a determined steering angle;

a centering resilient member, extending along the length of said rear rack, having a resiliency enabling said rear rack to return said two rear wheels to a neutral steering angle position;

a rear transmission mechanism connected to said rear rack;

an actuator connected to said rear transmission mechanism for axially displacing said rear rack via said rear transmission mechanism against said resiliency of said centering resilient member;

at least one steering angle sensor for sensing the steering angle of said two rear wheels;

an electronic control unit capable of determining a steering angle for said two rear wheels from electric signals received from said vehicle speed sensor, each said front wheels steering angle sensor, and each said rear wheels steering angle sensor and capable of supplying a level of electric current to said actuator to thereby electrically empower said actuator to steer said two rear wheels at said determined steering angle; and an electronic power regulation unit capable of selectively and electrically disabling said actuator according to electric signals received from said vehicle speed sensor, said level of said electric current supplied by said electronic control unit to said actuator, and a predetermined electric current limiting function;

wherein said electronic power regulation unit comprises:
an electronic comparator electrically connected between said electronic control unit and said actuator; and
an electronic controller electrically connected between said vehicle speed sensor and said electronic comparator;
wherein said electronic controller is capable of receiving electric signals from said vehicle speed sensor, determining an electric current limit level according to said electric signals received from said vehicle speed sensor and said predetermined electric current limiting function, and transmitting an electric signal representative of the value of said electric current limit level to said electronic comparator; and
wherein said electronic comparator is capable of receiving an electric signal representative of the value of said level of said electric current supplied by said electronic control unit to said actuator, receiving said electric signal representative of said value of said electric current limit level, comparing said value of said level of said electric current and said value of said electric current limit level, and electrically disabling said actuator only when said value of said level of said electric current is greater than said value of said electric current limit level.

3. The steering system according to claim 2, wherein said electronic comparator comprises an electronic operational amplifier.

4. The steering system according to claim 3, wherein said electronic operational amplifier has an inverting input, a non-inverting input, and an output, wherein said inverting input is electrically connected to said electronic control unit, said non-inverting input is electrically connected to said electronic controller, and said output is electrically connected to said actuator.

5. The steering system according to claim 2, wherein said electronic controller includes an electronic memory wherein said predetermined electric current limiting function is electrically stored.

* * * * *